Nov. 12, 1940.  L. F. CLERC  2,220,888
REFRIGERATING APPARATUS
Filed Jan. 25, 1939  3 Sheets-Sheet 2
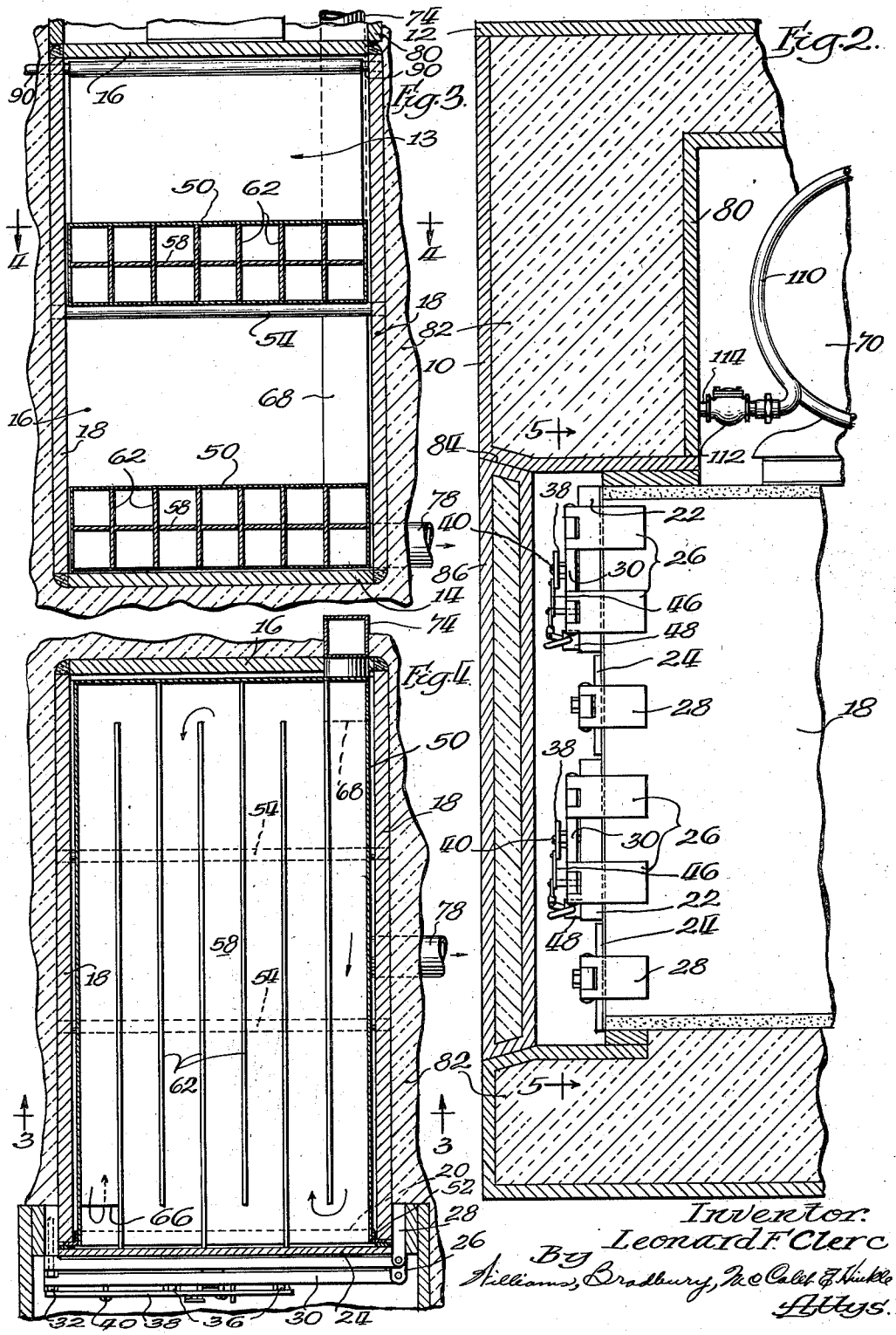
Inventor:
Leonard F. Clerc
By Williams, Bradbury, McCaleb & Hinkle
Attys.

Nov. 12, 1940.   L. F. CLERC   2,220,888
REFRIGERATING APPARATUS
Filed Jan. 25, 1939   3 Sheets-Sheet 3
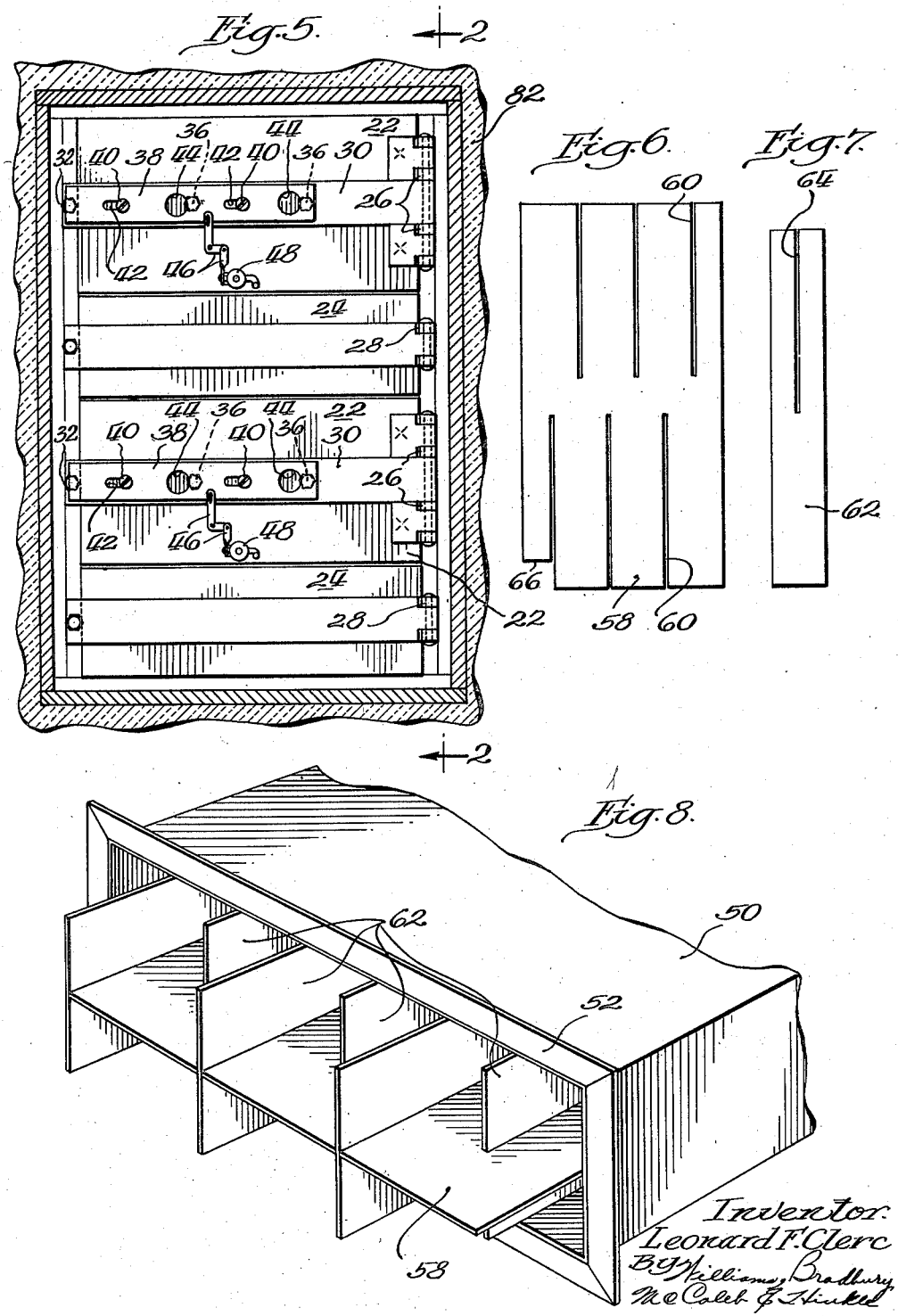

Patented Nov. 12, 1940

2,220,888

UNITED STATES PATENT OFFICE 2,220,888

REFRIGERATING APPARATUS

Leonard F. Clerc, Chicago, Ill.

Application January 25, 1939, Serial No. 252,706

7 Claims. (Cl. 62—91.5)

My invention relates generally to refrigerating apparatus, and more particularly to such apparatus using solidified carbon dioxide or "dry ice" as the refrigerating medium.

It is an object of my invention to provide an improved apparatus for efficiently utilizing dry ice as a refrigerating medium for the cooling of frozen food in display cabinets, compartments in which frozen food products are stored or shipped, and in general cooling chambers in which it is desirable to maintain a very low temperature.

A further object is to provide an improved refrigerating apparatus utilizing dry ice as a refrigerant, in which means are provided for maintaining the dry ice under pressure.

A further object is to provide an improved pressure sealed container for dry ice with improved means for transferring heat from a fluid to be cooled to the dry ice.

A further object is to provide an improved dry ice refrigerating unit having improved means to control the rate of evaporation of the dry ice and to control the transfer of heat from the fluid to be cooled to the dry ice.

A further object is to provide an improved indicator to show the amount of dry ice contained in the apparatus.

A further object is to provide an improved pressure container for dry ice having doors through which the supply of dry ice may be replenished, and having improved means for preventing the opening of said doors until the pressure within the chamber has been released.

A further object is to provide an improved apparatus for efficiently utilizing dry ice as a refrigerating medium for quick freezing food and other freezable products, and for general use in air conditioning apparatus.

Other objects will appear from the following description, reference being had to the accompanying drawings in which:

Figure 2 is a fragmentary sectional view of the apparatus looking in a direction opposite to that of Figure 1;

Figure 3 is a fragmentary vertical sectional view taken on the line 3—3 of Figure 4;

Figure 4 is a fragmentary horizontal sectional view taken on the line 4—4 of Figure 3;

Figure 5 is a vertical sectional view taken on the line 5—5 of Figure 1;

Figures 6 and 7 are plan views of parts of the heat exchange compartment; and

Figure 8 is a perspective view of the end of one of the heat exchange compartments.

Figure 1:
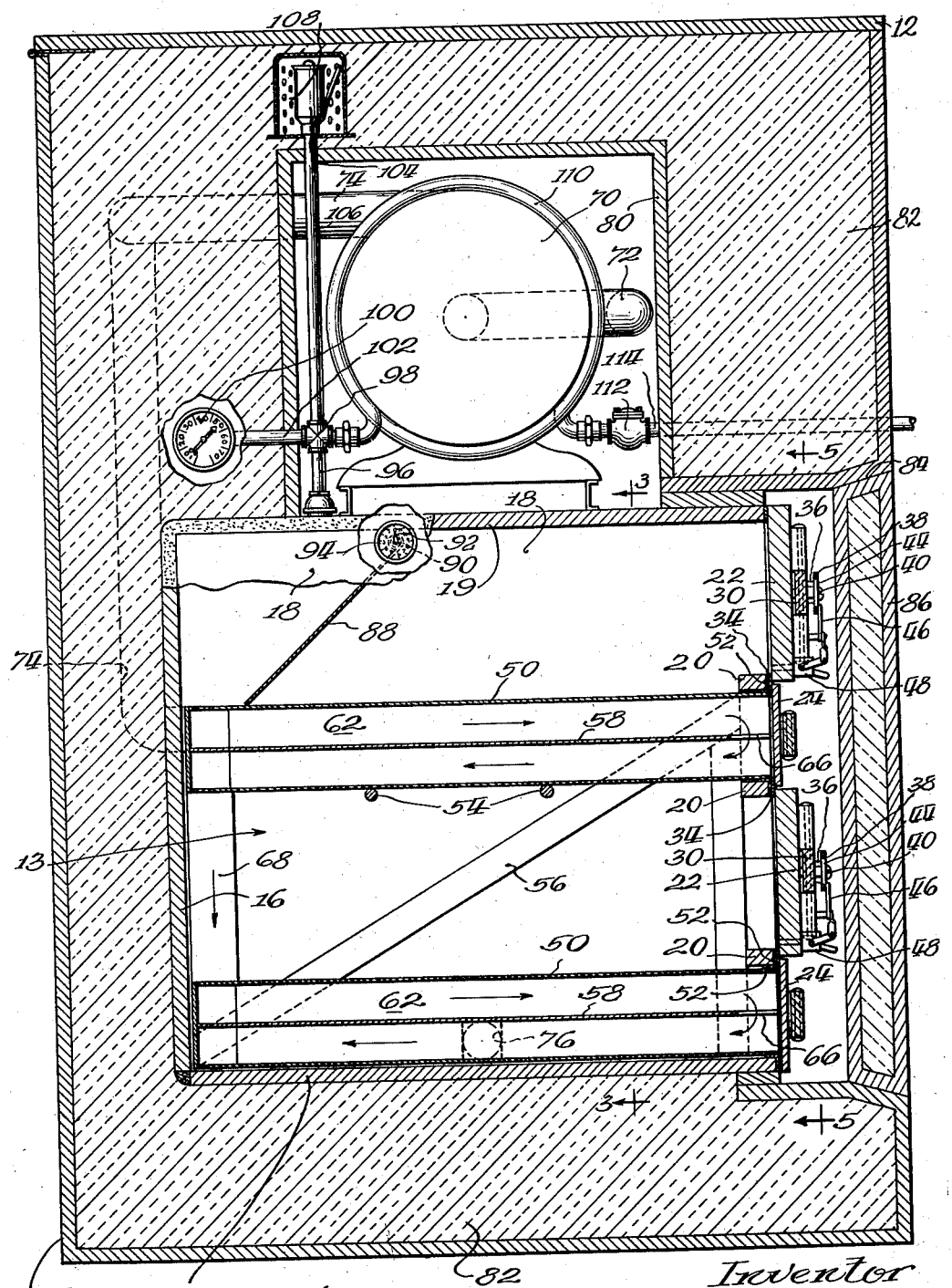
Figure 1 is a vertical sectional view of a portion of the heat transfer unit and air circulating system.

As indicated above, the apparatus of my invention is adapted for cooling any chamber which it is desired to maintain at a relatively low temperature and therefore I have shown only the apparatus for supplying the cooled air to such chamber and for withdrawing the warm air from said chamber. As shown in Figure 1, this apparatus comprises a cabinet having outer walls 10, which may be of sheet metal, plywood or the like, and which is provided with a cover 12, which may be hinged to one of the side walls 10. Suitably supported within the cabinet formed by the walls 10 and cover 12 is a strong rigid compartment 13 comprising a bottom wall 14, a side wall 16, end walls 18, a top wall 19, and an open front across which extend heavy transverse sills 20. The walls 14, 16, 18 and 19 are preferably welded together to form an airtight compartment capable of withstanding high pressures in the order of fifty to one hundred pounds per square inch. The front of the compartment is closed by a pair of relatively large doors 22 and smaller doors 24 which are suitably hinged to lugs 26 and 28 respectively which in turn may be welded to the end wall 18. Inasmuch as the doors 22 must be capable of withstanding relatively high pressures, they are secured in closed position by locking bars 30 which are likewise hinged to the lugs 26 and are provided with cap screws 32 which are threaded in suitable lugs welded to the outside of the opposite wall 18 in order firmly to press the doors 22 against suitable gaskets surrounding the openings in the front of the compartment 13. The bars 30 are provided with pressure screws 36, the ends of which abut against the doors 22. After the screws 32 have been tightened, the screws 36 may be further tightened so as to clamp the doors 22 firmly in place and thus enable them to resist high internal pressures in the container. In order to prevent the opening of either of the doors 22 while a high pressure is still present in the compartment 13, the cap screws 36, as well as the screws 32, are covered by plates 38 which are mounted for longitudinal slidable movement upon the clamping bars 30 by a pair of shouldered studs 40. These studs extend through elongated slots 42 formed in the plates 38 and have apertures 44 which are adapted to register with the cap screws 36 whenever the plate is moved to the right (Figure 5).

Such movement to the right is however normally prevented by a linkage 46 connected to the movable part of a relief valve 48. With this arrangement access to the cap screws 36 and 32 is prevented until the valve 48 has been opened to relieve the pressure within the compartment 13.

Rigidly secured in the compartment 13 is a pair of baffle casings 50, the front ends of which are open and have flanges 52 (Figure 8) which are welded to the sills 20 and to the bottom 14 of the compartment 13. The casing 50 is supported by a pair of tie rods 54, the ends of which are welded in the end walls 18. A pair of reenforcing bars 56 extend diagonally from adjacent the bottom of the compartment to the sill 20 to aid in supporting the latter against the outward pressure exerted thereon. Each of the casings 50 has a removable baffle assembly therein, comprising a horizontal plate 58 provided with longitudinally extending slots 60 and a plurality of vertical divider plates 62 having longitudinal slots 64. The baffles are formed by assembling the vertical divider plates 62 on the horizontal plate 58 by causing inter-engagement of their slots 60 and 64. The vertical divider plates 62 are shorter than the plate 58 so that as a result when the baffle assembly is slid into the casing 50 a long circuitous passageway will be formed extending back and forth above the plate 58, past the plate 58, through the cut-out corner portion 66 to the space beneath the baffle. The circuitous passageway thus formed in the upper casing 50 is connected in series with the similar passageway through the lower casing by a conduit 68 which is suitably welded to the casings 50.

An electric motor driven blower 70 is suitably mounted on the top wall 19 of the compartment 13 and receives air from the chamber to be cooled through an inlet pipe 72. The discharge from the blower 70 is directed through a conduit 74 to the inlet end of the circuitous passageway formed in the upper casing 50. As shown in Figure 4, the conduit 74 extends through the rear wall 16 of the compartment 13 and is of course welded thereto so as to form a pressure-tight seal. The end of the circuitous passageway in the lower casing 50 has an outlet 76 which is welded to a conduit 78 extending through an end wall 18 of the compartment and leads to the chamber to be cooled. The conduit 78 will normally be connected to discharge into the top of the chamber to be cooled while the conduit 72 will ordinarily lead from the bottom of such chamber. The blower 70 and associated parts are protected by a housing 80 which rests upon the top of the compartment 13. The space between the compartment 13, housing 80, and the outer walls of the cabinet, is filled with suitable heat insulation 82. The opening 84 in the front of the cabinet is closed by a hinged door 86.

The space between the casings 50 and above the upper casing is adapted to be filled, through the doors 22, with blocks of dry ice. When filling the portion of the compartment above the upper casing 50, a follower plate 88 secured to a hinge pin 90 will be swung upwardly from the position in which it is shown in Figure 1. The pin 90 extends through a stuffing box in the wall 18 of the compartment and outwardly through the side wall of the cabinet and is provided at its end with a pointer 92 registrable with a suitable scale 94 so that the position of the follower 88 may readily be determined. As the dry ice sublimates the follower 88 will swing downwardly and thus indicate by the connected pointer 92 the approximate amount of dry ice remaining in the compartment.

The gaseous carbon dioxide resulting from the sublimation of the dry ice escapes from the compartment 13 through a pipe 96 which extends through the top 19 and is suitably welded thereto. The pipe 96 connects with a cross T 98. A pressure gauge 100 mounted on an external wall of the cabinet is connected to the cross T 98 by a pipe 102 while a pressure relief valve 104 is connected to the cross T by a pipe 106. The relief valve 104 is protected by a perforated casing 108 which permits the escape of carbon dioxide released by the valve 104 to the insulation 82 which is sufficiently porous to permit the escape of the carbon dioxide to the atmosphere through the various interstices around the top of the cabinet. The carbon dioxide discharged through the pipe 96 is conducted through a pipe 110 coiled around the casing of the blower 70 so as to precool the air as it passes through the blower. A pressure regulating valve 112 is connected to the end of the coiled pipe 110 and has its outlet end connected to the atmosphere through a pipe 114.

In operation, the doors 22 will be opened after first relieving the pressure by opening the pressure relief valves 48 and the space in the compartment above the casings 50 filled with dry ice. Thereafter the doors 22 will be closed and clamped tightly in closed position by means of the cap screws 36 and 32. After the dry ice has been inserted and the doors clamped in closed position, the relief valves 48 are closed, thus sliding the plates 38 to the left (Figure 5) until the heads of the clamping screws 32, 36, are covered thereby, so as to be inaccessible until the vent relief valves are again opened. Upon supplying current to the motor driving the blower 70, air from the chamber to be cooled will be drawn through the conduit 72, precooled by the coiled pipe 110 and discharged through the conduit 74 into the circuitous passageway formed in the upper casing 50, from whence it will flow through the circuitous passageway of the lower casing 50 through the conduit 68. During the passage of air through the circuitous passageways, it will be cooled substantially to the temperature of the dry ice contained in the compartment 13 and very cold air will thus be discharged through the outlet 76 and conduit 78 to the chamber to be cooled. The dry ice is maintained at a relatively low temperature in the order of —40° F., because the sublimation of the dry ice is controlled by the pressure regulating valve 112. If this valve 112 is set for relieving the pressure in the compartment 13 whenever it exceeds approximately fifty-five pounds per square inch, the temperature of the casings may readily be maintained at a temperature somewhat below —40° F. The safety valve or pressure relief valve 104 operates only in the event that through some accident the regulating valve 112 fails to function.

The blower 70 is preferably of a type which is capable of discharging air at several pounds pressure. In this way the air flowing through the circuitous passageways in the casings 50 will be under a slight compression, facilitating the transfer of heat from the air to the walls of the casing 50. Furthermore, as the slightly compressed air is discharged through the outlet conduit 78, it may again expand to atmospheric pressure (assuming that the chamber into which the discharge is at atmospheric pressure) and thus be further cooled. In effect, the air which is being cooled in itself forms a refrigerating medium thereby increasing the efficiency of heat transfer between the chamber to be cooled and the dry ice.

Assuming that the air withdrawn from the chamber through the conduit 72 contains moisture, the frosting will take place substantially wholly within the casings 50 and upon the baffle plates 58 and 62. For this reason the baffle assemblies are made removable from the casings 50. By opening the doors 24, the baffle assemblies may be withdrawn from the casings and the frost removed by plunging the baffle assemblies in water. Any frost collecting on the inner surface of the casings 50 may easily be scraped from these surfaces and removed through the openings which are normally closed by the doors.

It has been found that due to the low temperatures at which the compartment 13 is normally maintained, an efficiently sealing gasket for the doors 22 presents a problem. I have found, however, that by making these gaskets of buckskin, a perfect seal may easily be maintained which will withstand the low temperatures and relatively high pressures encountered.

The motor for driving the blower 70 may of course be thermostatically controlled by the temperature of the chamber being cooled so that it will operate only when the temperature in such chamber arises above a predetermined maximum temperature. With such control the chamber and contents therein may readily be maintained at a temperature considerably below 32° F., and in fact may when required for the particular products being refrigerated, be maintained at a temperature below 0° F.

This refrigerating unit may therefore be used for the storage and transport of so-called quick frozen foods which, to maintain their freshness, must be kept at very low temperatures, preferably considerably below freezing temperature. Such temperatures cannot ordinarily be maintained by ice refrigeration.

While I have shown a particular form of my invention, it will be apparent to those skilled in the art that numerous modifications may be made without departing from the basic principles of the invention. I therefore desire by the following claims to include within the scope of my invention such variations and modifications by which substantially the results of my invention may be obtained by the use of substantially the same or equivalent means.

I claim:

1. In a refrigerating unit, the combination of a sealed chamber for containing dry ice used as the refrigerating medium, a heat transfer device located in said chamber, a blower for circulating air through said device, a conduit for conveying carbon dioxide gas from said chamber, said conduit including a portion in heat transfer relationship with said blower to pre-cool the air passing therethrough, and a pressure regulating valve in said conduit for controlling the pressure in said chamber.

2. Refrigerating apparatus comprising joined walls forming a pressure-tight chamber for receiving an evaporating cooling medium and having a doorway formed therein, a door for closing said doorway, means to clamp said door in closed position, a tray holder comprising an open-ended pressure-tight casing projecting into said chamber and having the edge surrounding its open end sealed to one of the walls of said chamber to make the interior of said tray holder accessible from without said chamber, a partitioned defrosting tray positioned in said tray holder and removable therefrom, said tray forming with the walls of said holder, a long circuitous passageway for air to be cooled by the cooling medium in said chamber, and means for forcing air under pressure through said inlet conduit.

3. In a refrigerating unit for dry ice refrigeration, the combination of a sealed gas pressure-tight compartment having a plurality of heat transfer devices secured therein, said devices being surrounded by the walls of said compartment upon all sides except one, and being spaced from one another to permit the placement of a large block of dry ice therebetween, said devices having air conducting passageways therethrough which are accessible from the outside of said compartment for defrosting, conduit means connecting the air passageways of said devices in series, and a blower for forcing air under pressure through said conduit.

4. Refrigerating apparatus comprising a sealed pressure-tight compartment having an opening for receiving dry ice, a closure for said opening, a heat transfer unit located in said chamber and comprising an open end casing containing baffle elements, said casing having its open end extending through a wall of said chamber, a door normally closing said open end of said casing, whereby upon opening said door the interior of said casing and the baffles therein will be accessible for defrosting without removing said casing from said compartment, a blower for circulating air to be cooled through said heat transfer unit, a vent conduit leading from said compartment and having a portion in heat transfer relation with said blower to pre-cool the air passing therethrough, and a loaded valve in said vent conduit for maintaining the dry ice in said compartment under pressure.

5. Refrigerating apparatus comprising a sealed pressure-tight compartment having an opening for receiving dry ice, a closure for said opening, a heat transfer unit located in said chamber and comprising an open end casing containing removable baffle assemblies, said casing having its open end extending through a wall of said chamber, a door normally closing said open end of said casing whereby upon opening said door, said baffle assembly may be removed from said casing for defrosting and the interior walls of said casing may be defrosted, means for circulating air to be cooled through said heat transfer unit, a vent conduit leading from said compartment, and a loaded valve in said vent conduit for maintaining the dry ice in said compartment under a predetermined pressure.

6. Refrigerating apparatus comprising a sealed pressure-tight compartment for receiving dry ice, a heat transfer unit located in said compartment and having its interior accessible from outside said compartment for defrosting, a follower plate pivotally mounted in said compartment and arranged to rest upon a block of dry ice therein, means external to said compartment to indicate the position of said follower plate, means for circulating air to be cooled through said heat transfer unit, a vent conduit leading from said compartment, and a loaded valve in said conduit for maintaining the dry ice in said compartment under pressure.

7. Refrigerating apparatus comprising a sealed pressure-tight compartment having a door permitting charging of said compartment with blocks of dry ice, means for clamping said door in closed position, a manually operable valve for releasing pressure in said compartment, an interlock to prevent operation of said clamping means while said pressure releasing valve is open, a heat transfer unit located in said compartment and having its interior accessible from outside said compartment for defrosting, means for circulating air to be cooled through said heat transfer unit, a vent conduit leading from said compartment, and a loaded valve in said conduit for maintaining the dry ice in said compartment under pressure.

LEONARD F. CLERC.